United States Patent [19]

Nakamura

[11] Patent Number: 5,163,135
[45] Date of Patent: Nov. 10, 1992

[54] COMPUTER SYSTEM AND METHOD FOR SETTING RECOVERY TIME UPON EXECUTION OF AN I/O COMMAND

[75] Inventor: Nobutaka Nakamura, Oome, Japan

[73] Assignee: Kabushiki Kaisha Toshiba, Kawasaki, Japan

[21] Appl. No.: 866,122

[22] Filed: Apr. 7, 1992

Related U.S. Application Data

[63] Continuation of Ser. No. 406,426, Sep. 11, 1989, abandoned.

[30] Foreign Application Priority Data

Sep. 13, 1988 [JP] Japan .................. 63-229014

[51] Int. Cl.$^5$ ............................................. G06F 13/14
[52] U.S. Cl. ...................... 395/275; 364/284.2; 364/238.3; 364/271.5; 364/DIG. 1
[58] Field of Search .................. 364/DIG. 1, DIG. 2

[56] References Cited

U.S. PATENT DOCUMENTS

| | | | |
|---|---|---|---|
| 4,330,826 | 5/1982 | Whiteside et al. | 364/200 |
| 4,451,886 | 5/1984 | Guest et al. | 364/200 |
| 4,661,905 | 4/1987 | Bomba et al. | 364/200 |
| 4,772,888 | 9/1988 | Kimura | 340/825.5 |
| 5,065,313 | 11/1991 | Lunsford | 395/275 |

FOREIGN PATENT DOCUMENTS

0082683 6/1983 European Pat. Off. .
0114523 8/1984 European Pat. Off. .

Primary Examiner—Dale M. Shaw
Assistant Examiner—Gopal C. Ray
Attorney, Agent, or Firm—Finnegan, Henderson, Farabow, Garrett and Dunner

[57] ABSTRACT

In a computer system, a CPU bus cycle control section receives a bus cycle request (BC-REQ) to generate a system bus cycle request (SBC-REQ) and feeds back a ready notice (READY-a) to the CPU. A system bus cycle control section performs the bus cycle control in response to the system bus cycle request (SBC-REQ) from the control section and generates a ready notice (READY-b) to the CPU bus cycle control section. The computer system includes a timer for delaying the ready notice (READY-b), a selector for selecting one of the ready notice (D'READY) delayed by the timer and the ready notice (READy-b) from the system bus cycle control section and supplies the selected ready notice to the CPU bus cycle control section and a register for holding access control information including a recovery state bit FRDY and recovery time data (RDY3-RDY0) of the timer.

19 Claims, 4 Drawing Sheets

COMPUTER SYSTEM AND METHOD FOR SETTING RECOVERY TIME UPON EXECUTION OF AN I/O COMMAND

This application is a continuation of application Ser. No. 07/406,426 filed Sep. 11, 1989 now abandoned.

BACKGROUND OF THE INVENTION

1. Field of the Invention

This invention relates to a computer system and a method for setting a recovery time.

2. Description of the Related Art

Recently, with the development of semiconductor technology, the cost of microprocessors, memories, and peripheral control LSIs has become extremely lowered. Computer systems with relatively high performance can be constructed by combining ICs via system buses. As it has been strongly demanded to enhance the operation rate of such computer systems, the operation rate of the microprocessor which is the nucleus of the computer system, is made even higher and the function thereof tends to be further enhanced. The high operation rate of the computer system can be attained by effecting the processes of the microprocessor in a pipeline fashion, using a cache memory, a write buffer, or the like as well as by enhancing the operation rate of the microprocessor itself.

However, peripheral LSIs were developed after the microprocessor was developed. Because there are many kinds of LSIs, it takes a longer time to develop such LSIs. Therefore, the operation rate of peripherals LSIs have not been significantly improved. Most of the hardware optional cards and application softwares are designed to function on conventional computer systems with an operation rate which is relatively low and which cannot respond to the high rate access.

As described above, a computer system is required to attain the high rate operation, and at the same time, the computer system is required to maintain compatibility with a conventional computer system. That is, when a high rate computer system is newly developed, it is required to support not only hardware devices and application softwares which are designed for the developed computer systems having an operation rate of the same level, but also hardware optional cards and application software which have been designed to function on the conventional computer systems with an operation rate which is relatively low.

Figure 1A:
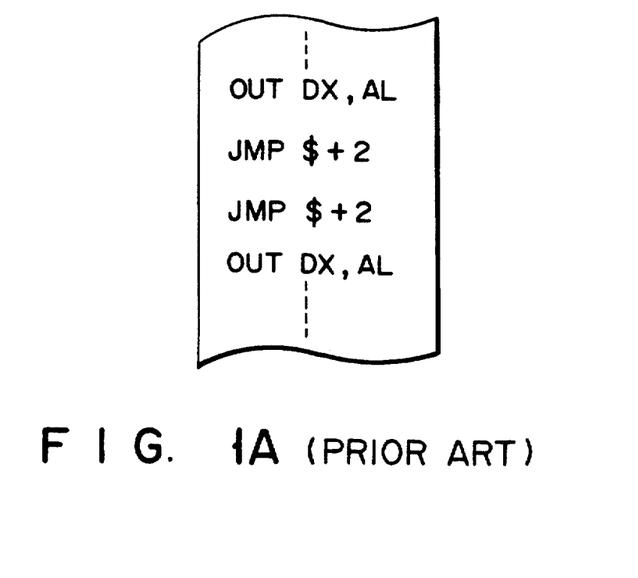
FIGS. 1A and 1B are diagrams for illustrating the conventional method for attaining a recovery time.
Figure 1B:
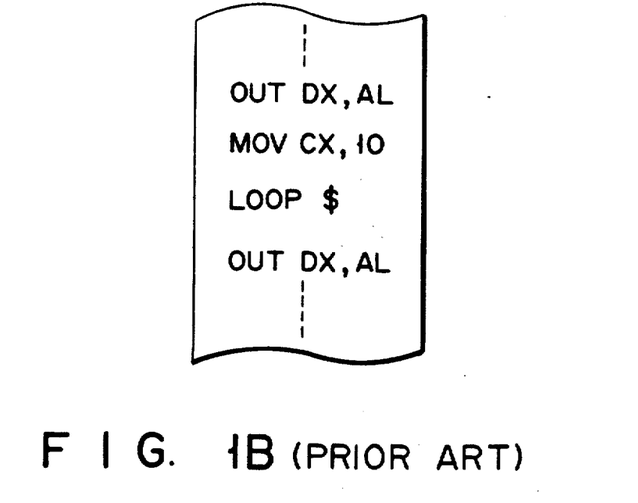

When input/output (I/O) commands are successively executed for low operation rate hardware, the hardware cannot respond to the commands and an error occurs. Therefore, in the prior art, in order to obtain a recovery time upon execution of an I/O command, one or more dummy jump commands (JMP), as shown in FIG. 1A, or a dummy loop, as shown in FIG. 1B, is inserted into the program including the I/O commands.

However, in a case where the operation clock frequency of the microprocessor becomes high and pipeline processing is used, the dummy jump command or dummy loop will be completed in a moment. In this case, a sufficiently long recovery time cannot be attained.

SUMMARY OF THE INVENTION

This invention has been made in view of the above fact, and an object of this invention is to provide a computer system and a method in which a recovery time can be set to support application software designed to function on computer systems with an operation rate which is relatively low.

In order to achieve the above object, the computer system includes a bus cycle request section for executing a transfer command to generate a bus cycle request and for waiting for the execution of a command next to the transfer command until a first ready notice is input; a delay section for delaying an input second ready notice in accordance with input delay time data to obtain a third ready notice; a selecting section for selecting one of the input second ready notice and the third ready notice from the delay section as the first ready notice in accordance with input selection control instruction and for supplying the selected ready notice to the bus cycle request section; a bus cycle control section for controlling the bus cycle in response to the bus cycle request from the bus cycle request section and for generating the second ready notice and for supplying the same to the selection section and the delay section; and an access control information outputting section for respectively supplying the delay time data and the selection control instruction of the stored access control information to the delay section and the selection section.

In order to attain the above object, the method for setting a recovery time in computer systems includes the steps of:

executing a transfer command to generate a bus cycle request;

controlling the bus cycle in response to the bus cycle request to generate a first ready notice;

holding access control information which contains a selection control instruction and delay time data;

delaying the first ready notice in accordance with the delay time data to obtain a second ready notice;

selecting one of the first ready notice and the second ready notice in accordance with the selection control instruction and supplying the selected ready notice as a third ready notice; and waiting for execution of the next command until the third ready notice is generated.

As described above, according to the computer system of this invention, the recovery time can be set in a programmable fashion. Therefore, not only programs designed for the computer system itself but also application software designed to function on computer systems with an operation rate which is relatively low can be supported.

DETAILED DESCRIPTION OF THE PREFERRED EMBODIMENTS

There will now be described a computer system according to embodiments of the present invention with reference to the accompanying drawings.

First, the schematic construction of the computer system according to a first embodiment of the present invention will be explained with reference to FIG. 2.

Figure 2:
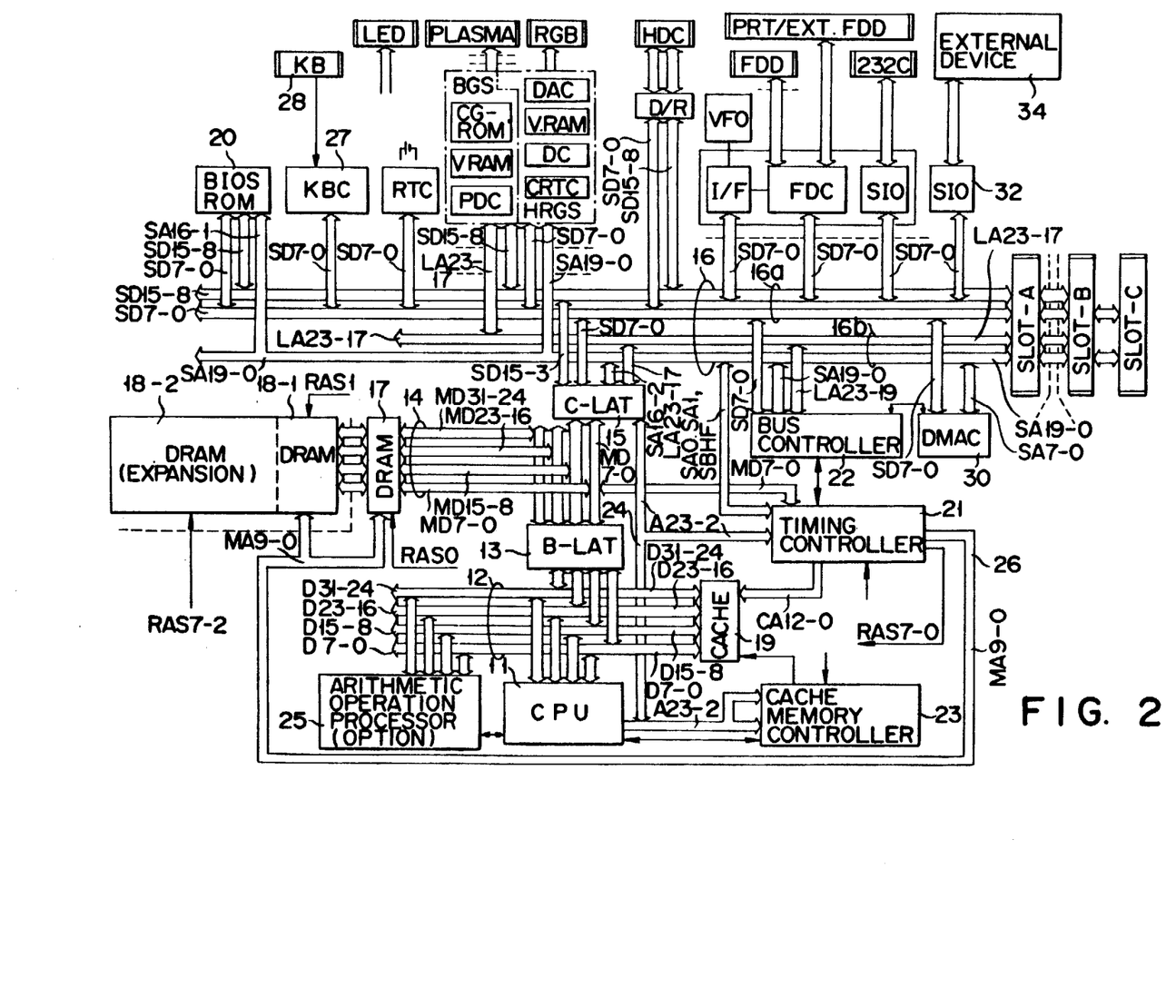
FIG. 2 is a block diagram showing the schematic construction of a computer system to which this invention is applied.

In FIG. 2, a 32-bit CPU 11 is connected to a CPU bus including a CPU data bus (D31-0) 12 and a CPU address bus (A23-2) 24. The CPU 11 supplies an address to the CPU address bus 24, supplies data to the CPU data bus 12 and receives data from the CPU data bus 12. An optional arithmetic operation processor 25 is connected to the CPU data bus 12 and effects the arithmetic operation according to the instruction from the CPU 11. A B latch (B-LAT) 13 functions to connect the CPU data bus 12 to a memory data bus (MD31-0) 14 according to a control signal from the timing controller 21. The CPU data bus 12 and the CPU address bus 24 are respectively connected to a cache memory 19 and a cache memory controller 23. Data is read out from the cache memory 19 without accessing memories (DRAM) 17, 18-1 and 18-2 when a cache hit has occurred.

The memory sections (DRAM) 17, 18-1 and 18-2 are connected to the memory data bus 14 and a memory address bus (MA9-0) 26. Further, control signals RAS0 to RAS7 are supplied to the memory sections 17, 18-1 and 18-2. Each of the memory sections 17 and 18-1 has a memory capacity of 1MB and is provided as a standard memory. The memory section 18-2 is an expansion memory and can be used as expandable memory sections of the maximum memory capacity of 12MB. The expandable memory sections are specified in the unit of 1MB by the signals RAS2-7 and the address thereof is designated by column and row addresses of 10 bits supplied from the timing controller 21 via the memory address bus 26. The latch (C-LAT) 15 connects the memory data bus 14 and CPU address bus 24 to a system data bus 16a and a system address bus 16b of the system bus 16 respectively in response to the timing control signal from the bus controller 22.

The timing controller 21 is connected to the CPU address bus 24, the memory address bus 26, a part of the memory data bus 14, the system address bus 16b and cache address bus (CA12-0) and generates various timing control signals to control the operation of the computer system. More specifically, the timing controller 21 generates the timing control signal for controlling the B-LAT 13 in response to control data output from the CPU 1 onto a CPU control data bus (not shown) and a transfer control signal from the bus controller 22. Further, the timing controller 21 generates a memory address and a cache memory address. The cache memory address is supplied to the cache memory 19. A bus controller 22 connected to the system bus 16 is used to perform the control on the operation on the system bus 16. More specifically, the bus controller 22 generates the timing control signal for controlling the C-LAT 15 in response to control data on a system control data bus (not shown) of the system bus 16 and a transfer control signal from the timing controller 21.

A BIOS ROM 20 stores a program for controlling the data input/output operation, i.e., a basic input/output system program. An external device 34 is connected to the system bus 16 via a serial input/output interface 32. Commands and data are supplied from a keyboard (KB) 28 to the CPU 11 via a keyboard controller (KBC) 27. In addition, various interfaces are connected to the system bus 16, but the explanation of those portions which do not relate to this invention is omitted.

Now, the computer system according to the first embodiment of this invention will be described in detail with reference to FIG. 3.

Figure 3:
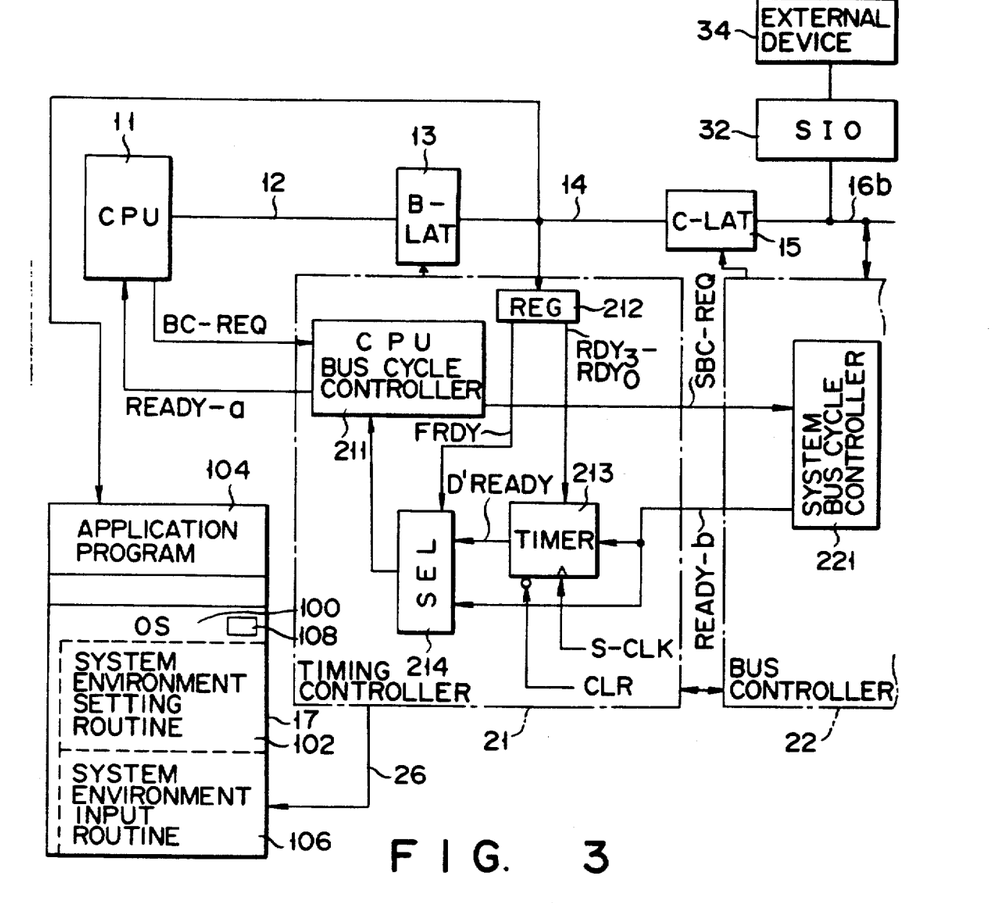
FIG. 3 is a block diagram showing the construction of a computer system according to a first embodiment of the present invention.

In FIG. 3, the CPU 11 executes a system environment input routine 106 stored in the memory section 17 when the computer system is set up. The routine 106 is part of an operating system (OS) 100. In the routine 106, access control information is input from the keyboard 28 in accordance with whether or not an external device whose operation rate is relatively slow is connected to the system bus 16. When an external device 34 with a low operation rate is connected to the system bus 16 via the interface 32, the access control information contains recovery time data and a recovery state bit FRDY of logic "0" indicating that the recovery mode is to be set. When an external device 34 with a low operation rate is not connected, the recovery state bit FRDY of the access control information is set to logic "1". The input access control information is written into a table 108 of the memory section 17.

Further, the CPU 11 executes a system environment setting routine 102 stored in the memory section 17 when the computer system is started up. The routine 102 is part of the OS 100. In the routine 102, the CPU 11 reads out the access control information from the table 108 and supplies the access control information to a register 212 of the timing controller 21 via the B-LAT 13. The access control information contains the recovery state bit FRDY and the recovery time data.

Also, the CPU 11 executes an application program 104 stored in the memory section 17, and when a transfer command of the application program 104 to the external device 34 is executed, the CPU 11 generates a bus cycle request (BC-REQ). When the bus cycle is effected, the CPU 11 waits without executing a command next to the transfer command until a ready notice (READY-a) is input. The CPU 11 executes the next command in response to the input of the ready notice (READY-a).

The timing controller 21 includes a CPU bus cycle controller 211, the register 212, a timer 213 and a selector SEL 214. The CPU bus cycle controller 211 receives the bus cycle request (BC-REQ) from the CPU 11 and generates and outputs a system bus cycle request (SBC-REQ) to a system bus cycle controller 221 of the bus controller 22. Further, the CPU bus cycle controller 211 supplies the ready notice (READY-a) to the CPU 11 in response to the ready notice from selector (SEL) 214 of the timing controller 21. The ready notice (READY-a) may be supplied to the CPU 11 via the cache memory controller 23 shown in FIG. 2. When the system bus cycle controller 221 receives the bus cycle request (SBC-REQ) from the CPU bus cycle controller 211, it generates and supplies a ready notice (READY-b) at a predetermined timing in the system bus cycle to the timer 213 and SEL 214.

The register 212 receives and holds the access control information including the recovery time data (RDY3-RDY0) and the recovery state bit FRDY, supplied from the CPU 11 via CPU data bus 12 and B-LAT 13. The recovery time data (RDY3-RDY0) is supplied to the timer 213. The recovery state bit FRDY in the access control information is supplied as a selection control signal to the SEL 214. The timer 213 delays the ready notice (READY-b) returned from the system bus cycle controller 221 by a time designated by the recovery time data. That is, the timer 213 effects the counting operation in synchronism with a system clock S-CLK and generates a delayed ready notice (D'READY) when system clocks of the number corresponding to the recovery time data (RDY3-RDY0) have been counted. Then, the ready notice (D'READY) is output to the SEL 214. The system clock S-CLK and a clear signal CLR for clearing the timer 213 are produced in the timing controller 21 and the clear signal CLR is generated when the power source of the computer system is turned on.

Figure 4:
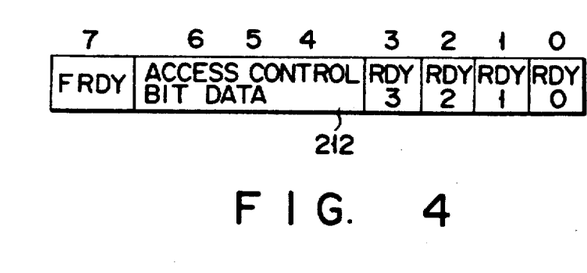
FIG. 4 shows the format of access control information used in the first embodiment.

The SEL 214 selects one of the ready notice (D'READY) delayed by the timer 213 and the ready notice (READY-b) output from the system bus cycle controller 221 in accordance with the recovery state bit FRDY from the register 212, and supplies the selected ready notice to the CPU bus cycle controller 211. As shown in FIG. 4, the SEL 214 selects the ready notice (D'READY) delayed by the timer 213 when the seventh bit of the access control information held in the register 212 as the recovery state bit FRDY is set at logic "0". In contrast, when the recovery state bit FRDY is set at the logic "1", the SEL 214 selects the ready notice (READY-b) which is output from the system bus cycle controller 221 and is not delayed.

Now, the operation of the first embodiment of the computer system according to this invention will be explained.

When the power source of the computer system is turned on, the timer 213 is reset by the signal CLR. Then, the CPU 11 executes the operating system (OS) 100. When the system environment setting routine 102 of the OS 100 is executed, the access control information including the recovery state bit FRDY and the recovery time data is read out from the table 108 and is set into the register 212 via the B-LAT 13. That is, when an exterior device 34 with a low operation rate is connected to the I/O interface 32, for example, the access control information including the recovery state bit FRDY of logic "0" indicating that the recovery mode is to be set and the recovery time data (RDY3-RDY0) indicating a time to be delayed is set into the register 212. Then, the recovery state bit (FRDY) of the access control information is supplied as a selection signal to the selector 214. Further, the recovery time data (RDY3-RDY0) is supplied to the timer 213.

In a case where the recovery time is not required to be longer than the system bus cycle, the access control information including the recovery state bit RFDY of logic "1" is set into the register 212. In this manner, when the system environment is changed, a user can always start to execute the system environment input routine 106 by using a special command and specify that the external device 34 which requires a long recovery time is connected to the system bus 16 via the I/O interface 32. In addition, it is possible to set a recovery time corresponding to the operation rate of the external device 34. Then, the access control information is produced in accordance with these inputs and is written into the table 108. In this example, the recovery time is also input, but it becomes unnecessary to input the recovery time in the routine 106 if the recovery time is fixed.

Thereafter, the CPU 11 executes the application program 104. When a transfer command of the program 104 to the external device 34 is executed while the program 104 is executed, the CPU 11 outputs a bus cycle request (BC-REQ) to the CPU bus cycle controller 211 of the timing controller 21. When the CPU bus cycle controller 211 receives the bus cycle request (BC-REQ) from the CPU 11, it transmits the request (BC-REQ) as a system bus cycle request (SBC-REQ) to the system bus cycle controller 221 of the bus controller 22. When receiving the system bus cycle request (SBC-REQ), the system bus cycle controller 221 effects the bus cycle control and generates a ready notice (READY-b) at a predetermined timing of the bus cycle and supplies the same to the timing controller 21.

The ready notice (READY-b) is transmitted from the system bus cycle controller 221 to a delay path having a delay element disposed therein and a through path having no delay element disposed therein in the timing controller 21, and the ready notice (READY-b/D'READY) passing through one of the two paths is selected in response to the recovery state bit FRDY in the register 212 and is supplied as the ready notice (READY-a) to the CPU 11 via the CPU bus cycle controller 211. That is, the ready notice (READY-b) is output from the system bus cycle controller 221 to the selector 214 and to the timer 213 of the timing controller 21. When receiving the ready notice (READY-b) from the system bus cycle controller 221, the timer 213 delays the ready notice READY-b by a time corresponding to the recovery time data (RDY3-RDY0) in the register 212 and outputs the delayed ready notice to the SEL 214. When the recovery state bit FRDY in the register 212 is set at the logic "0" (FRDY=0), the selector 214 selects the ready notice (D'READY) delayed by the timer 213, and when it is set at the logic "1" (FRDY=1), the selector 214 selects the ready notice (READY-b) supplied from the system bus cycle controller 21. The selected ready notice (READY-b/D'READY) is supplied to the CPU 11 via the CPU bus cycle controller 211.

In a high-rate processing computer system with the above hardware construction having a programmable recovery mechanism, conventional application software for relatively low-rate hardware options and low-rate hardware can be supported, and at the same time, a full range of inherent processing performance can be achieved to attain the high-rate access function.

Now, a computer system according to a second embodiment of the present invention will be explained in detail with reference to FIG. 5.

Figure 5:
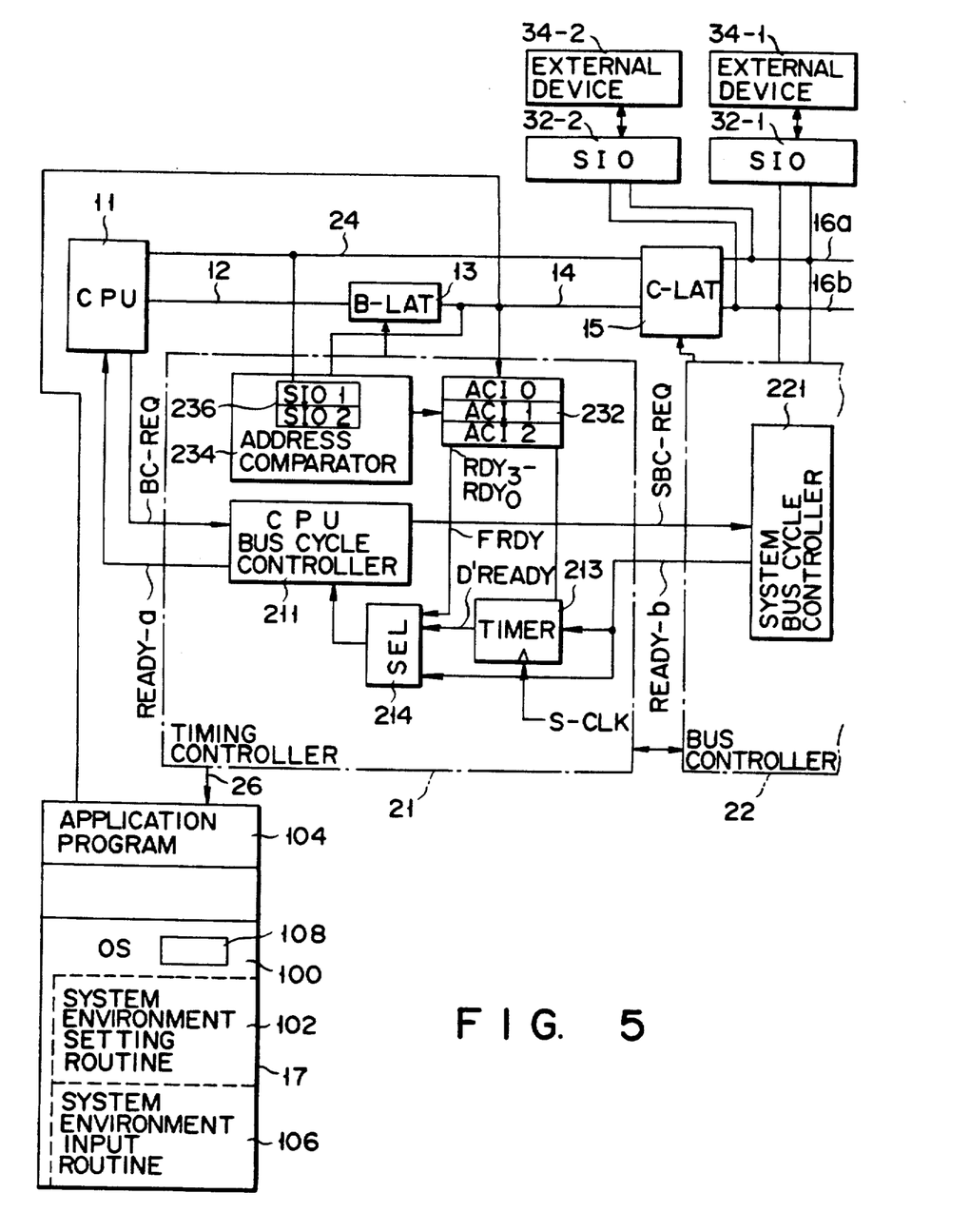
FIG. 5 is a block diagram showing the construction of a computer system according to a second embodiment of the present invention.

In FIG. 5, a plurality of I/O interfaces 32-1 and 32-2, which are respectively connected to relatively low-rate external devices 34-1 and 34-2, are used instead of the interface 32 in the first embodiment. In the first embodiment, if a low-rate interface is connected and the recovery mode is designated in the system environment input routine 106, the recovery mode is always set in each bus cycle irrespective of whether a high-rate interface is connected or not. In the second embodiment, the recovery mode is set only for the bus cycle in which the low-rate interface is accessed. That is, in the second embodiment, a higher operation rate can be attained. The second embodiment will be explained below, but portions which are the same as those of the first embodiment shown in FIG. 3 are denoted by the same reference numerals and the explanation thereof is omitted.

In the second embodiment, an address comparator 234 and a register group 232 are used instead of the register 212 of the first embodiment. The address comparator 234 is connected to the CPU address bus and the memory data bus 14 and has an address register disposed therein. Assume that the interfaces 32-1 and 32-2 are specified as relatively low-rate interfaces when the system environment input routine 106 is executed. At this time, addresses SIO1 and SIO2 of the interfaces 32-1 and 32-2 are input in addition to the recovery time data and the recovery state bits. The access control information containing the addresses is written in a table 108.

When the computer system is started up and the system environment setting routine 102 is executed, the access control information is read out from the table 108, the addresses SIO1 and SIO2 of the respective interfaces are output to the address register 236 of the address comparator 234 and are latched therein. Then, the access control information ACI1 and ACI2 including the recovery bit of logic "0" and the recovery time data for the respective interfaces are supplied to each register of the register group 232 and latched therein. Further, the recovery state bit of logic "1" included in the access control information ACI0 is output to a specific one of the register group 232.

Thereafter, the application program 104 is executed and when a transfer command for the interface 32-1 is executed, a bus cycle request (BC-REQ) and a transfer address of the interface 32-1, for example, together with the transfer command are output from the CPU 11. The transfer address is received by the address comparator 234 via the CPU address bus 24 and compared with an address held in the address register 236.

When the transfer address coincides with the interface address SIO1, in this example, of the interface addresses held in the address register 236, the address comparator 234 generates and supplies a first output instruction to the register group 232. The register group 232 outputs the access control information ACI1 corresponding to the interface 32-1 to the timer 213 and selector (SEL) 214. The same operation as that described above is effected when the transfer address coincides with the interface address SIO2. Thereafter, the same operation as that in the first embodiment is effected.

When the transfer address does not coincide with any of the interface addresses held in the address register 236, the access control information ACI0 is output from the register group 232 to the timer 213 and the SEL 214. Therefore, in this case, the recovery mode is not set, and the ready notice (READY-b) from the system bus cycle controller 221 is selected by the SEL 214 and immediately fed back to the CPU 11.

As described above, according to the second embodiment, the recovery mode is set only when a relatively low-rate interface is accessed, and the recovery mode is not set when another type interface is accessed, thus maintaining a high-rate processing function.

What is claimed is:

1. A computer system with a bus cycle, including means for setting a recovery time, comprising:
   memory means for storing a system environment setting routine;
   table means for storing access control information including delay time data and an input selection control instruction;
   program executing means, coupled to the memory means and to the table means, for executing the system environment setting routine, for reading the access control information, and for outputting the access control information;
   supplying means for supplying a transfer command and a system command;
   bus cycle request means for executing the transfer command, supplied from the supplying means, to generate a bus cycle request and for waiting for execution of the system command, supplied from the supplying means, until a first ready notice is input to the supplying means;
   bus cycle control means for controlling the bus cycle in response to the bus cycle request generated by the bus cycle request means and for generating a second ready notice;
   access control information outputting means for receiving the access control information from the program executing means and for outputting the delay time data nd the input selection control instruction;
   delay means for receiving the second ready notice and the delay time data, for delaying the second ready notice in accordance with the delay time data, and for generating a third ready notice; and
   selecting means for receiving the second ready notice, the third ready notice, and the input selection control instruction, for selecting one of the second ready notice and the third ready notice as the first ready notice, in accordance with the input selection control instruction, and for supplying the first ready notice to said bus cycle request means.

2. A computer system with a bus cycle, including means for setting a recovery time, comprising:
   information output means for outputting information upon start-up of said computer system, wherein said information output means comprises:
      memory means for storing a system environment setting routine;
      table means for storing access control information including delay time data and an input control instruction;
      program executing means for executing the system environment setting routine in said memory means upon start-up of said computer system, for reading out the access control information from said table means and for outputting the access control information;
   supplying means for supplying a transfer command and a system command;
   bus cycle request means for executing the transfer command supplied from the supplying means, to generate a bus cycle request, and for waiting for execution of the system command, supplied from the supplying means, until a first ready notice is input to the supplying means;
   bus cycle control means for controlling the bus cycle in response to the bus cycle request generated by the bus cycle request means and for generating a second ready notice in response to execution of the bus cycle;
   access control information outputting means for receiving the access control information from the program executing means and for outputting the delay time data nd the input selection control instruction, wherein the access control information output means includes register means for holding the access control information received from the information output means;
   delay means for receiving the second ready notice and the delay time data, for delaying the second ready notice in accordance with delay time data, and for generating a third ready notice; and selecting means for receiving the second ready notice, the third ready notice, and the input selection control instruction, for selecting one of the second ready notice and the third ready notice as the first ready notice, in accordance with the input selection control instruction, and for supplying the first ready notice to the bus cycle request means.

3. A system according to claim 2, wherein said system environment setting routine is part of an operating system.

4. A system according to claim 2, further comprising information write-in means for writing the access control information into said table upon setting-up said computer system.

5. A system according to claim 4, wherein said information write-in means comprises:

second memory means for storing a system environment input routine; and second program executing means for executing the system environment input routine in said second memory means upon setting up said computer system and writing the access control information input thereto into said table.

6. A system according to claim 5, wherein said system environment input routine is part of an operating system.

7. A system according to claim 5, wherein said system environment setting routine is part of an operating system.

8. A computer system with a bus cycle, including means for setting a recovery time, comprising:

information output means for holding access control information containing a selection instruction and delay time data upon starting up said computer system;

supplying means for supplying a transfer command and a system command;

bus cycle request means for executing the transfer command, supplied from said supplying means, to generate a bus cycle request and for waiting for execution of the system command, supplied from said supplying means, until a first ready notice is input to the supplying, wherein said bus cycle request means includes means for outputting a transfer address upon execution of the transfer command;

bus cycle control means for controlling the bus cycle in response to the bus cycle request from said bus cycle request means and for generating a second ready notice;

access control information output means for receiving the access control information from the information output means and for outputting the delay time data and the selection control instruction means, wherein said access control information output means includes:

address register means for holding a predetermined address;

address comparing means for receiving the predetermined address from said information output means, for comparing the transfer address with the predetermined address upon execution of the transfer command, and for generating an information output instruction when the transfer address coincides with the predetermined address;

register group means for holding the access control information including the delay time data and the selection control instruction, input from said information output means, and for outputting the selection control instruction and the delay time data in response to the information output instruction from said address comparing means;

delay means for receiving the second ready notice from the bus cycle control means and the delay time data from the register group means, for delaying the second ready notice in accordance with the delay time data, and for generating a third ready notice; and selecting means for receiving the second ready notice, the third ready notice, and the input selection control instruction for selecting one of the second ready notice and the third ready notice as the first ready notice in accordance with the selection control instruction and for supplying the first ready notice to the bus cycle request means.

9. A system according to claim 8, wherein said information output means comprises:

memory means for storing a system environment setting routine;

a table for storing the access control information; and program executing means for executing the system environment setting routine in said memory means upon starting up said computer system, reading out the access control information from said table and outputting the access control information to said access control information output means.

10. A system according to claim 9, wherein said system environment setting routine is part of an operating system.

11. A system according to claim 9, further comprising information write-in means for writing into said table the access control information input thereto upon setting up said computer system.

12. A system according to claim 11, wherein said information write-in means comprises:

second memory means for storing a system environment input routine; and second program executing means for executing the system environment input routine in said second memory means upon setting up said computer system and writing the access control information into said table.

13. A method for setting a recovery time in a computer system with a bus cycle, comprising the steps of:

supplying a transfer command and a system command;

executing the transfer command to generate a bus cycle request and a transfer address;

waiting for execution of the system command until a first ready notice is obtained;

controlling the bus cycle in response to the bus cycle request, to generate a second ready notice;

holding access control information, the access control information containing a selection control instruction and delay time data;

holding a predetermined address;

reading out the selection control instruction, the delay time data, and the predetermined address;

comparing the predetermined address with the transfer address;

generating an information generating instruction when the predetermined address coincides with the transfer address;

outputting the selection control instruction and the delay time data in response to the information generating instruction;

delaying the second ready notice in accordance with the delay time data, to obtain a third ready notice;

selecting one of the second ready notice and the third ready notice as the first ready notice in accordance with the selection control instruction; and supplying the first ready notice to cause execution of the system command.

14. A method for setting a recovery time in a computer system with a bus cycle, comprising the steps of:

supplying a transfer command and a system command;

reading out access control information containing selection control instruction, delay time data, and a predetermined address upon starting up said computer system;

executing the transfer command to generate a bus cycle request and a transfer address;

waiting for execution of the system command until a first ready notice is obtained;

controlling the bus cycle in response to the bus cycle request, to generate a second ready notice;

holding the access control information the predetermined address, wherein said holding step includes the sub-steps of:

holding the predetermined address to compare the predetermined address with the transfer address upon execution of the transfer command and generating an information generation instruction when the predetermined address coincides with the transfer address; and holding the selection control instruction and the delay time data to generate the selection control instruction and the delay time data in response to the information generation instruction;

delaying the second ready notice in accordance with the delay time data, to obtain a third ready notice;

selecting one of the second ready notice and the third ready notice in accordance with the selection control instruction, to obtain the first ready notice; and executing of the system command when the first ready notice is obtained.

15. A method according to claim 14, wherein said step of generating the access control information comprises the steps of;

executing a system environment setting routine upon starting up said computer system to write the access control information in a table; and reading out the access control information.

16. A method according to claim 15, wherein said system environment setting routine is part of an operating system.

17. A method according to claim 15, further comprising writing the access control information into the table upon setting up said computer system.

18. A method according to claim 17, wherein said information writing step is executed on the basis of the system environment input routine and said system environment input routine is part of an operating system.

19. A computer system with a bus cycle for setting a recovery time, comprising:

means for holding access control information, including delay time data and a selection control instruction;

supplying means for supplying a transfer command and a system command;

bus cycle request means for executing the transfer command, supplied from said supplying means, to generate a bus cycle request, and for waiting for execution of the system command, supplied from the supplying means until a first ready notice is input to the supplying means;

bus cycle control means for controlling the bus cycle in response to the bus cycle request from the bus cycle request means and for generating a second ready notice;

access control information outputting means for receiving the delay time data and the selection control instruction, wherein the access control information output means includes:

address register means for holding a predetermined address;

address comparing means for receiving the predetermined address, for comparing the transfer address with the predetermined address, and for generating an information output instruction when the transfer address coincides with the predetermined address;

register means for holding the delay time data and the selection control instruction, and for outputting the selection control instruction and the delay time data in response to the information output instruction from said address comparing means;

delay means for receiving the second ready notice from the bus cycle control means, for delaying the second ready notice in accordance with delay time data received from the register means, and for generating a third ready notice; and selecting means for receiving the second ready notice and the third ready notice, for selecting one of the second ready notice and the third ready notice as the first ready notice, in accordance with a selection control instruction, and for supplying the first ready notice to said bus cycle request means.

* * * * *

UNITED STATES PATENT AND TRADEMARK OFFICE
CERTIFICATE OF CORRECTION

PATENT NO. : 5,163,135
DATED : November 10, 1992
INVENTOR(S) : Nobutaka Nakamura It is certified that error appears in the above-identified patent and that said Letters Patent is hereby corrected as shown below:

Claim 8, Column 9, Line 46, after "supplying" insert --means--.

Signed and Sealed this

Twenty-fifth Day of January, 1994

*Attest:*

BRUCE LEHMAN

*Attesting Officer*     *Commissioner of Patents and Trademarks*